United States Patent [19]

Nagaoka et al.

[11] Patent Number: 5,378,520
[45] Date of Patent: Jan. 3, 1995

[54] SUPPORTED ENCAPSULATED-LENS RETROREFLECTIVE SHEETING

[75] Inventors: Yoshiyuki Nagaoka, Yamagata, Japan; Vera L. Lightle, Hudson, Wis.

[73] Assignee: Minnesota Mining and Manufacturing Company, St. Paul, Minn.

[21] Appl. No.: 991,097

[22] Filed: Dec. 16, 1992

[51] Int. Cl.⁶ .............................................. G02B 5/128
[52] U.S. Cl. ................................ 428/72; 359/518;
   359/538; 156/276; 156/290; 156/308.4;
   428/240; 428/241; 428/261; 428/269; 428/283;
   428/284; 428/286; 428/325; 428/327; 428/406;
   428/407; 428/423.1; 428/424.2
[58] Field of Search ............... 359/518, 536, 538, 540,
   359/541; 428/72, 178, 201, 203, 241, 261, 269,
   325, 402, 404, 406, 407, 423.1, 424.2, 425.6, 240,
   283, 284, 286, 327; 156/219, 220, 221, 276, 290,
   308.4

[56] References Cited

U.S. PATENT DOCUMENTS

| | | | |
|---|---|---|---|
| 3,190,178 | 6/1965 | McKenzie | 88/82 |
| 3,758,192 | 9/1973 | Bingham | 359/538 |
| 4,025,159 | 5/1977 | McGrath | 350/105 |
| 4,533,592 | 8/1985 | Bingham | 428/213 |
| 4,637,950 | 1/1987 | Bergeson et al. | 428/168 |
| 4,663,213 | 5/1987 | Bailey et al. | 428/204 |
| 4,763,985 | 8/1988 | Bingham | 359/518 |
| 4,896,943 | 1/1990 | Tolliver et al. | 350/105 |
| 4,897,136 | 1/1990 | Bailey et al. | 156/145 |
| 5,064,272 | 11/1991 | Bailey et al. | 359/541 |
| 5,066,098 | 11/1991 | Kult et al. | 359/540 |
| 5,069,964 | 12/1991 | Tolliver et al. | 428/325 |
| 5,110,655 | 5/1992 | Engler et al. | 428/143 |
| 5,316,838 | 5/1994 | Crandall et al. | 428/283 |

*Primary Examiner*—Patrick J. Ryan
*Assistant Examiner*—Marie R. Macholl
*Attorney, Agent, or Firm*—Gary L. Griswold; Walter N. Kirn; Roger R. Tamte

[57] ABSTRACT

Encapsulated-lens retroreflective sheeting comprising (1) a layer of binder material having a layer of retroreflective elements partially embedded in its top surface; (2) a transparent cover sheet disposed in spaced relation from the layer of retroreflective elements; (3) a network of narrow intersecting bonds comprising binder material embossed from the layer of binder material into contact with the cover sheet so as to adhere the layer of binder material and cover sheet together and form a plurality of cells within which retroreflective elements are hermetically sealed; the embossing of the layer of binder material leaving the bottom surface of the layer of binder material with an embossed configuration; and (4) a support sheet lastingly and directly adhered to said bottom surface of the layer of binder material and embossed with the layer of binder material so as to follow the embossed configuration of said bottom surface.

14 Claims, 1 Drawing Sheet

SUPPORTED ENCAPSULATED-LENS RETROREFLECTIVE SHEETING

FIELD OF INVENTION

The present invention is directed to encapsulated-lens sheeting (as originally described in U.S. Pat. No. 3,190,178) and especially forms of such sheeting that incorporate a support sheet or fabric which allow the sheeting to be incorporated into a pedestrian garment.

BACKGROUND

Encapsulated-lens retroreflective sheeting offers bright retroreflection and maintains that reflection even when wet with water. Such sheeting has been provided in flexible fabric supported forms for application to garments to make pedestrians wearing the garments more visible at night to drivers of approaching vehicles. Because the sheeting incorporates a supporting fabric it can be easily sewn or adhered or otherwise incorporated into a garment.

However, existing forms of fabric-supported encapsulated-lens sheeting have a number of disadvantages. Addition of a supporting fabric, typically accomplished by use of pressure-sensitive adhesive to adhere the fabric to the bottom surface of the sheeting, has produced a rather thick product which protrudes too far from the surface of a garment to which it is added, and unduly stiffens the garment. Also the steps of coating a pressure-sensitive adhesive and lamination of a fabric into the sheeting by means of the adhesive add to the cost of manufacture. Further, especially under the pressures that develop when the sheeting is wound into a storage roll, the adhesive can ooze through the fabric so as to cause adhesion between adjacent windings in the storage roll and cause contamination of the exterior surface of the sheeting.

SUMMARY OF THE INVENTION

The present invention provides a new supported encapsulated lens retroreflective sheeting that alleviates the noted problems, and the invention also provides a new process for preparing such sheeting. Briefly, the new process comprises (1) preparing a layer of binder material having a layer of retroreflective elements disposed over and partially embedded in its top surface ("top" refers to the exterior surface of the sheeting through which light is received for reflection, or, with respect to the underlying components of the sheeting, the surface that face in the same direction as the top exterior surface; "bottom" refers to the surface opposite from the top surface); (2) applying a support sheet to the bottom surface of the layer of binder material; (3) disposing a transparent cover sheet over the protruding surfaces of the layer of retroreflective elements; and (4) applying a network-like pattern of heat and pressure against the bottom surface of the support sheet so as to emboss the support sheet and further emboss binder material from the layer of binder material into contact with the cover sheet. The embossing step forms a unified article in which the layer of binder material and cover sheet are adhered together and a plurality of cells is formed within which retroreflective elements are hermetically sealed. The layer of binder material develops an embossed configuration and the support sheet follows that embossed configuration. Preferably the support sheet is laminated to the bottom surface of the layer of binder material by heat and pressure prior to the application of embossing heat and pressure.

By the described process a new sheeting is prepared which in brief summary comprises (1) a layer of binder material having a layer of retroreflective elements disposed over and partially embedded in its top surface; (2) a transparent cover sheet disposed in spaced relation from the layer of retroreflective elements; (3) a network of narrow intersecting bonds comprising binder material embossed from the layer of binder material into contact with the cover sheet so as to adhere the layer of binder material and cover sheet together and form a plurality of cells within which retroreflective elements are hermetically sealed; and (4) a support sheet lastingly and directly adhered to the bottom surface of the layer of binder material and embossed with the layer of binder material so as to follow the embossed configuration of the bottom surface of the layer of binder material. Preferably the support sheet comprises a fabric, and binder material from the layer of binder material penetrates into interstices of the fabric to enhance the adhesion of the fabric to the layer of binder material.

DETAILED DESCRIPTION

Figure 1:
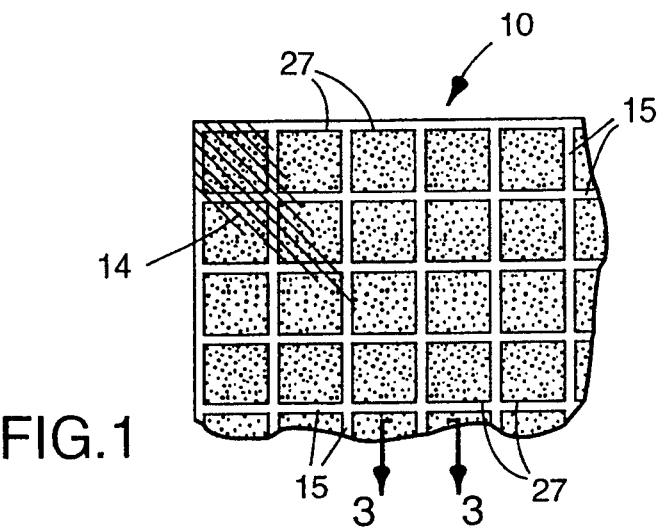
FIG. 1 is a top view of a portion of sheeting of the invention.
Figure 3:
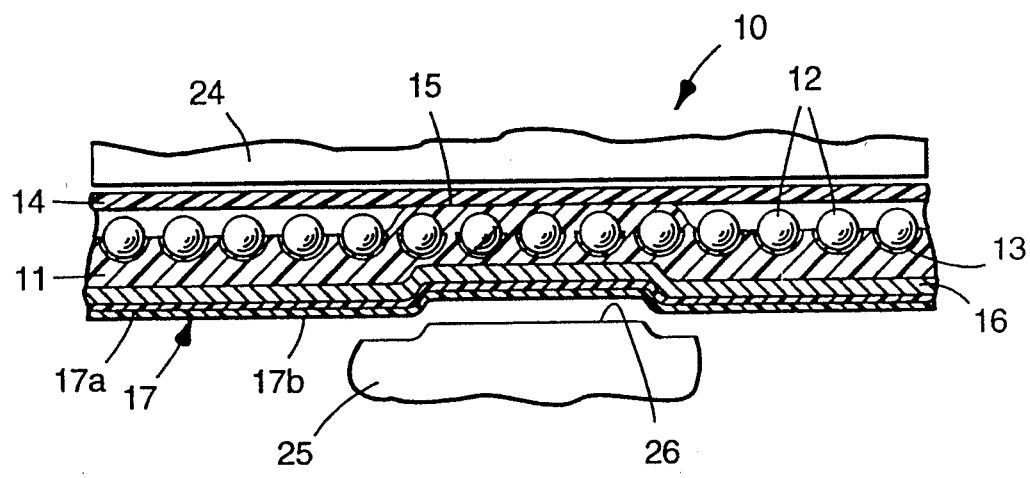
FIG. 3 is a greatly enlarged cross-section of sheeting of the invention together with parts of apparatus used during manufacture of the sheeting.

An exemplary finished sheeting of the invention 10 is pictured in top view in FIG. 1 of the drawings and in greatly enlarged cross-section in FIG. 3 (along the lines 3—3 in FIG. 1). As pictured, the exemplary sheeting 10 comprises

- a base layer of binder material 11;
- a layer of transparent microspheres 12 partially embedded in the top surface of the layer of binder material 11 and covered over their embedded or bottom surfaces with vapor-deposited specularly reflective material 13 (the specularly reflective material is typically a metal such as aluminum or silver or a dielectric material such as described in Bingham, U.S. Pat. No. 3,700,305 vapor-deposited onto the microspheres; in combination the microspheres and specularly reflective material form a retroreflective element supported in the binder material);
- a transparent cover or top sheet or film 14 disposed over the protruding or non-embedded surfaces of the microspheres 12 and bonded to the layer of binder material by a network of narrow bonds 15 comprising binder material embossed from the layer 11 through the microspheres 12 into adhering connection with the cover film 14;
- a support sheet 16 laminated to the bottom surface of the layer 11 of binder material and following the embossed configuration of the layer of binder material; and
- a protective film 17 which may be optionally included as explained below.

Figure 2:
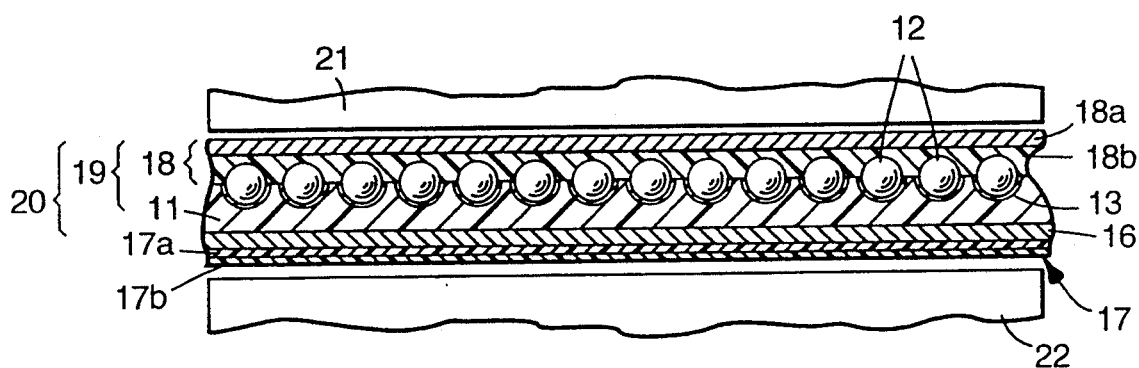
FIG. 2 is a greatly enlarged cross-section of an intermediate assembly occurring during preparation of sheeting of the invention.

In preparing sheeting of the invention the microspheres 12 are typically first removably and partially embedded in a carrier sheet such as polyethylene-coated paper (see Mckenzie, U.S. Pat. No. 3,190,178) and the surfaces of the microspheres protruding from the carrier sheet covered with the specularly reflective material 13 by vapor-deposition. A representative carrier sheet 18 is pictured in FIG. 2 of the drawings and includes a paper sheet 18a and polyethylene layer 18b. The intermediate product of microspheres embedded in the carrier sheet and covered with specularly reflective material is labeled as 19 in FIG. 2.

Binder material is then applied over the specularly reflective material as by coating the binder material from solution or a melt or by pressing a preformed layer of the binder material against the microspheres (see Bailey et al, U.S. Pat. No. 5,064,272, column 5, line 61, through column 6, line 17; the latter refers to the preferred practice of pressing the layer of binder material against the microspheres only to an extent that the binder material does not contact the portion of the coated specularly reflective material deposited onto the carrier sheet between the microspheres; thus when the carrier sheet is later separated from the layer of binder material, the specularly reflective material between the microspheres stays with the carrier sheet and does not cover the surface of the binder material between the microspheres, thereby minimizing coloration of the product by metallic specularly reflective material). Upon drying or cooling of the binder material, the layer 11 is formed with the microspheres partially embedded in the layer 11 and also partially embedded in the carrier sheet. The result is the construction labeled 20 in FIG. 2.

In a preferred practice of the invention the support sheet 16 is then laminated to the free surface of the layer of binder material. Such a lamination could occur later, for example, after removal of the temporary carrier sheet 18; but a lamination occurring with the carrier sheet in place better supports the assembly during the lamination operation. Lamination preferably is achieved by pressing the support sheet 16 against the binder material 11 and heating the assembly as by passing the assembly under pressure between a pair of rollers, represented in FIG. 2 by the parts marked 21 and 22, at least one of which is heated.

The support sheet 16 is preferably a fabric, and during the lamination operation portions of the binder material 11 penetrate into interstices of the fabric thereby firmly bonding the fabric to the binder material. To prevent the penetrated binder material from fouling the laminating rollers, a film 17 may be removably applied over the bottom surface of the support fabric. One useful film is a two-layer film which has heat-softenable layer 17a such as polyethylene and a nonsoftening layer 17b such as polyethylene terephthalate, and which can be heat-laminated to the support fabric. The film 17 becomes bonded to the support fabric, and can either remain as part of the final product or be stripped away prior to inclusion of the fabric in a garment or other use of the product.

Next, in the illustrated preferred process the carrier sheet 18 is stripped away, uncovering microspheres protruding from the layer 11 of binder material. A cover film 14 is laid against the protruding surfaces of the microspheres and the resulting assembly is subjected to an embossing operation as represented in FIG. 3. The whole assembly, comprising cover film 14, layer of binder material 11, support sheet 16 and protective sheet 17, is inserted between a pair of heated platens or rollers 24 and 25. One platen or roller (25) is an embossing platen having a pattern of raised ridges 26. The ridges 26 on the embossing platen press against the bottom of the protective sheet 17 to deform the protective sheet, support sheet 16, and binder layer 11 into the configuration shown in FIG. 3. The layer 11 of binder material is heated and pressed sufficiently so that it floods the microspheres in the area pressed and contacts the cover film 14 to develop a bond 15. The pattern of ridges on the embossing platen is such as to form the network of narrow bonds 15 illustrated in FIG. 1. The bonds intersect so as to define cells 27 within which microspheres are hermetically sealed. A variety of patterns can be used; for example the square cells of FIG. 1 can instead have a hexagonal pattern.

Useful cover films for inclusion in encapsulated-lens sheeting are well known. For sheeting of the invention polyolefin films, which have good flexibility even in low-temperature environments are especially desirable; examples are polyethylene, polypropylene and ethylene-acrylic acid copolymers. Ultraviolet absorbers are desirably included, especially in the polyolefin films to avoid deterioration of the film and underlying elements during outdoor weathering. Because the described polyolefin films are softer and may not exhibit a desired resistance to penetration by microspheres during the embossing operation represented in FIG. 3 of the drawings, the cover sheet desirably has a layer or coating (not pictured) of a harder, higher softening material as described in U.S. Pat. No. 5,066,098 (incorporated herein by reference). Polyurethanes are especially useful as the harder material, e.g., layers formed from aqueous colloidal urethane dispersion; or acrylic emulsions can also be used. Suitable commercial materials are sold under the tradenames of Neo Rez (polyurethanes) or Neo Cryl (acrylics) by Polyvinyl Chemical Industries.

Besides providing the noted resistance to penetration, such layers can enhance adhesion between the cover film and the binder material embossed into contact with the cover film. Also, the layers can be colored, as by inclusion of a dye.

Highly plasticized polyvinyl chloride films may also be used as the cover film.

In general, binder materials to be used in sheeting of the invention should have low glass transition temperatures ($T_g$), e.g., $-20°$ C. or lower, to maintain good low temperature performance. A thermoplastic polyurethane polymer is especially useful as the binder material 11 and provides good durability and flexibility, including flexibility at low temperatures. Although aromatic polyurethanes discolor in sunlight, addition of a hiding type pigment such as titanium dioxide avoids any discoloration of the product. A white coloration is typically desired to minimize the gray or metallic color caused by a metal coating on the microspheres.

Ethylene-acrylic acid copolymers are another useful polymer in the binder material, though it is difficult to add a pigment to such a material. If an ethylene-acrylic acid polymeric cover film is used with an ethylene-acrylic acid polymeric binder material, there is no need for a polyurethane hard layer on the cover film to achieve a good bond to the cover film.

The binder material can comprise a mixture of polymeric materials as well as other ingredients. For example, a vinyl chloride/acetate copolymer is desirably mixed with a polyurethane polymer to provide flexibility. Heat-stabilizers and antioxidants can also be added to improve weatherability. Fluorescent dyes are also useful to provide brightly visible colors.

Fabrics are especially useful as the support sheet because they are durable, with high tensile strength; the binder material can penetrate the fabric to achieve a good bond; and fabrics avoid the plasticizers often included in polymeric films for flexibility, which can weaken adhesion and cause other problems. Spun-bond polyester fabrics are especially useful; they often comprise a bicomponent fiber with a polyethylene terephthalate core and a polyethylene or polyester outer layer that softens at a lower temperature than the polyethylene terephthalate core. Woven cloths are also useful. Polymeric films offer an alternative to fabric for some purposes.

Although removable liners such as the liner 17 are preferred in sheeting of the invention, they can be avoided, for example, by coating the bottom surface of the fabric (opposite surface from that bonded to the layer of binder material) with a suitable repellent material. However, materials should be chosen that maintain adhesion to the binder material. In fact, corona treatments are preferred with the described polyethylene-containing spun-bonded fabrics to enhance adhesion.

A finished product of the invention is thin, light weight and flexible, which preferably extends to low temperatures such as $-20°$ C. Preferably the complete product, without protective film 17, is 325 micrometers or less thick and is sufficiently flexible so that it can be readily wrapped around a 3 millimeter-diameter (0.125 inch) mandrel at room temperature, and preferably at $-20°$ C. The support sheet follows the embossed configuration of the bottom surface of the layer of binder material and therefore there are no voids for collection of moisture. Besides being incorporated into a garment, sheeting of the invention can be used by itself, e.g., as a sign that can be unwound from a storage roll and mounted where needed, as on the rear of a vehicle.

The invention will be further illustrated with the following example.

A solution of binder material prepared from the ingredients listed below was coated over a sheet 19 comprising a carrier sheet 18 in which microspheres 12 averaging 65 micrometers in diameter were embedded to about 30% of their diameter and coated with vapor-deposited aluminum.

|  | Parts by weight |
| --- | --- |
| Thermoplastic polyurethane resin[1] | 16.99 |
| Vinyl chloride/acetate copolymer[2] | 6.73 |
| Titanium dioxide[3] | 7.00 |
| Antioxidant[4] | 0.48 |
| Stearic acid | 0.48 |
| Methyl ethyl ketone | 49.49 |
| Cyclohexanone | 17.88 |

[1]Elast ET 1145 sold by Takeda Badische Urethane Industries, Ltd, Tokyo; reaction product of methyl diisocyanate and a polyester type polyol comprising tetraethylene glycol and adipic acid; number-average molecular weight is 140,000 and weight-average molecular weight is 310,000; softening point, 110° C.; glass transition temperature; −23° C.; modulus, 17 kg/cm²; hardness, 63 (JIS Shore A durometer); tear strength, 42 kg/cm
[2]VYHH from Union Carbide
[3]Tipaque from Ishihara Co.
[4]Irganox from Ciba Geigy The coated solution was dried at an elevated temperature of 120° C. (80°–120° C. is a useful range) to a thickness of about 50 micrometers.

Thereupon a polyester textile fabric (Toray textile fabric No. 501) was laminated to the dried exposed surface of the layer of binder material; a temperature of 100° C. and 5 kg$_f$/cm² pressure was used (ranges of 70–100° C. and 3–5 kg$_f$/cm² are useful). A two-layer protective film 17 comprising a polyethylene top layer and polyethylene terephthalate bottom layer had been previously laminated to the bottom surface of the fabric.

In an alternative example, a nonwoven spun-bond fabric comprising bicomponent fibers having a polyethylene layer on a polyethylene terephthalate core (Unitika nonwoven fabric S1003WDO) was laminated to the layer of binder material instead of the polyester fabric. The lamination temperature and pressure were 100° C. and 5 kg$_f$/cm², respectively. In this example, protective film 17 was not used.

In both examples the carrier sheet 18 was then stripped away, and a 75 micrometer thick cover film 14 of extruded ethylene/acrylic acid copolymer (Primacor 3440 supplied by Dow Chemical) containing an ultraviolet light absorber laid into contact with the exposed surfaces of the microspheres. This assembly was then subjected to embossing pressure using a smooth-surfaced rubber-covered top pressure roll heated to 160° C. and a bottom metal roll heated to 80° C. and carrying a network of embossing ridges that intersect in a hexagonal pattern. The rolls were pressed together to develop a pressure of 3–5 kg$_f$/cm² and the assembly was pulled between the rolls at a rate of 3 meters per minute. The protective film 17 was removed after the embossing operation.

The resulting supported retroreflective sheeting was then subjected to a series of tests as shown in the following Table 1.

TABLE 1

| Test Item | Test Method | Result |
| --- | --- | --- |
| Backing edge[5] | Knife Cutting | OK |
| Adhesive bleeding | 40 kg/100 cm²/65° C./336 hrs. | OK |
| Reflectivity | 0.20/−4°, 30°, 40° | 325, 346, 320 CPL[6] |
| Gloss | 60° gloss | OK |
| Water resistance | 40° C./120 hrs. | OK |
| Hot water resistance | 80° C./60 mins. | OK |
| Heat resistance | 120° C./60 mins. | OK |
| Heat cycle | 8 cycles[7] | OK |
| Head humidity | 65° C./95% RH/192 hrs. | OK |
| Impact resistance | −20° C./80Pl | OK |
| Flexibility | −20° C./0.125 inch Mandrel | OK |
| Weathering | Sunshine Weatherometer | |
|  | 750 hrs. | OK |
|  | QUV 750 hrs. | OK |

[5]Integrity of edge and freedom from loose threads
[6]CPL is candelas per lux per square meter
[7]Alternating between 30° C. and 0% RH (12 hours) and 80° C. and 500% RH (12 hours)
[8]Manufactured by Suga Shikenki Co., Operated to provide an ultraviolet exposure for 750 hours at a black panel temperature of 63° C. ± 3° C., with a waterjet of 18 minutes per 120 minutes In still another example, a woven polyester fabric (a 100 percent polyester 85.5×60 construction weighing 3.1 ounces/yard² using textured polyester yarns, 1/150/34 warp and fill supplied by Milliken) was used as the support sheet. In this example, lamination of the fabric to the bottom layer of binder material and embossing of the assembly to the cover film were performed simultaneously. The top pressure roll was unheated and the bottom metal roll was heated to 215° C.

Various modifications and alterations of this invention will become apparent to those skilled in the art without departing from the scope and spirit of this invention.

What is claimed is:

1. Supported retroreflective sheeting comprising (1) a layer of binder material having a layer of retroreflective elements disposed over and partially embedded in its top surface; (2) a transparent cover sheet disposed in spaced relation from the layer of retroreflective elements; (3) a network of narrow intersecting bonds comprising binder material embossed from the layer of binder material into contact with the cover sheet so as to adhere the layer of binder material and cover sheet together and form a plurality of cells within which retroreflective elements are hermetically sealed; the embossing of the layer of binder material leaving the bottom surface of the layer of binder material with an embossed configuration; and (4) a support fabric lastingly and directly adhered to said bottom surface of the layer of binder material and embossed with the layer of binder material so as to follow the embossed configuration of said bottom surface, binder material from the layer of binder material penetrating into interstices of the fabric.

2. Retroreflective sheeting of claim 1 in which the cover sheet comprises a polyolefin.

3. Retroreflective sheeting of claim 2 in which the polyolefin comprises an ethylene-acrylic acid polymer.

4. Retroreflective sheeting of claim 1 in which the binder material comprises a polyurethane.

5. Retroreflective sheeting of claim 4 in which the cover sheet comprises a polyolefin and the surface of the cover sheet contacted by the binder material is covered with a layer that comprises polyurethane.

6. Retroreflective sheeting of claim 1 in which a protective film covers the bottom surface of the support fabric.

7. Retroreflective sheeting of claim 6 in which the protective film is heat-laminated to the support fabric.

8. Retroreflective sheeting of claim 1 in which the layer of binder material is between about 25 and 50 micrometers in thickness.

9. A method for preparing a supported retroreflective sheeting comprising (1) preparing a layer of binder material having a layer of retroreflective elements disposed over and partially embedded in its top surface; (2) applying a support fabric to the bottom surface of the layer of binder material; (3) disposing a transparent cover sheet over the protruding surfaces of the layer of retroreflective elements; and (4) applying a network pattern of heat and pressure against the bottom surface of the support fabric so as to emboss the support fabric and further emboss binder material from the layer of binder material into contact with the cover sheet, thereby forming a unified article in which the layer of binder material and cover sheet are adhered together and a plurality of cells is formed within which retroreflective elements are hermetically sealed, and the support fabric follows the embossed configuration of said layer of binder material, with binder material penetrating into interstices of the fabric and holding the fabric to the binder material.

10. A method of claim 9 in which the support fabric is laminated to the bottom surface of the layer of binder material by heat and pressure prior to the application of embossing heat and pressure.

11. Supported retroreflective sheeting less than 325 micrometers thick and sufficiently flexible to be wrapped around a 3-millimeter-diameter mandrel at room temperature comprising (1) a layer of binder material having a glass transition temperature of $-20°$ C. or lower and having a layer of retroreflective elements disposed over and partially embedded in its top surface; (2) a transparent polyolefin-based cover sheet disposed in spaced relation from the layer of retroreflective elements; (3) a network of narrow intersecting bonds comprising binder material embossed from the layer of binder material into contact with the cover sheet so as to adhere the layer of binder material and cover sheet together and form a plurality of cells within which retroreflective elements are hermetically sealed; the embossing of the layer of binder material leaving the bottom surface of the layer of binder material with an embossed configuration; and (4) a support fabric lastingly and directly adhered to said bottom surface of the layer of binder material over its full area, the fabric being embossed with the layer of binder material so as to follow the embossed configuration of said bottom surface, and binder material from the layer of binder material penetrating into interstices of the fabric.

12. Retroreflective sheeting of claim 11 in which the support fabric comprises a spun-bond fabric.

13. Retroreflective sheeting of claim 11 in which the cover sheet comprises an ethylene-acrylic acid polymer.

14. Retroreflective sheeting of claim 11 in which the binder material comprises a polyurethane.

* * * * *

UNITED STATES PATENT AND TRADEMARK OFFICE
CERTIFICATE OF CORRECTION

PATENT NO. : 5,378,520
DATED : January 3, 1995
INVENTOR(S) : Yoshiyuki Nagaoka and Vera L. Lightle It is certified that error appears in the above-indentified patent and that said Letters Patent is hereby corrected as shown below:

Col. 6, line 35, "0.20" should read --$0.2°$--.

Col. 6, line 47, "500%" should read --50%--.

Signed and Sealed this

Twenty-fifth Day of April, 1995

Attest:

BRUCE LEHMAN

*Attesting Officer*     *Commissioner of Patents and Trademarks*